(No Model.) 2 Sheets—Sheet 1.

A. C. RUMBLE.
AIR BRAKE GOVERNOR.

No. 595,251. Patented Dec. 7, 1897.

Witnesses,
J. H. Innse
H. F. Ascheck

Inventor,
Alexander C. Rumble
By Dewey & Co.
Attys (No Model.) 2 Sheets—Sheet 2.

A. C. RUMBLE.
AIR BRAKE GOVERNOR.

No. 595,251. Patented Dec. 7, 1897.

Witnesses,
J. H. Morse
H. F. Ascheck

Inventor,
Alexander C. Rumble
By Dewey & Co.
Attys

United States Patent Office.

ALEXANDER C. RUMBLE, OF OAKLAND, CALIFORNIA, ASSIGNOR OF FIVE-EIGHTHS TO JOS. H. THOMPSON AND W. D. HUNTINGTON, OF SAME PLACE.

AIR-BRAKE GOVERNOR.

SPECIFICATION forming part of Letters Patent No. 595,251, dated December 7, 1897.

Application filed January 21, 1897. Serial No. 620,153. (No model.)

*To all whom it may concern:*

Be it known that I, ALEXANDER C. RUMBLE, a citizen of the United States, residing at Oakland, county of Alameda, State of California, have invented an Improvement in Air-Brake Governors; and I hereby declare the following to be a full, clear, and exact description of the same.

My invention relates to a device for controlling the brake mechanism of railway-cars.

It consists, essentially, in an automatically-operating mechanism whereby the pressure of the air and the consequent pressure of the brakes upon the wheels is regulated, and in certain details of construction, which will be more fully explained by reference to the accompanying drawings, in which—

Figure 1:
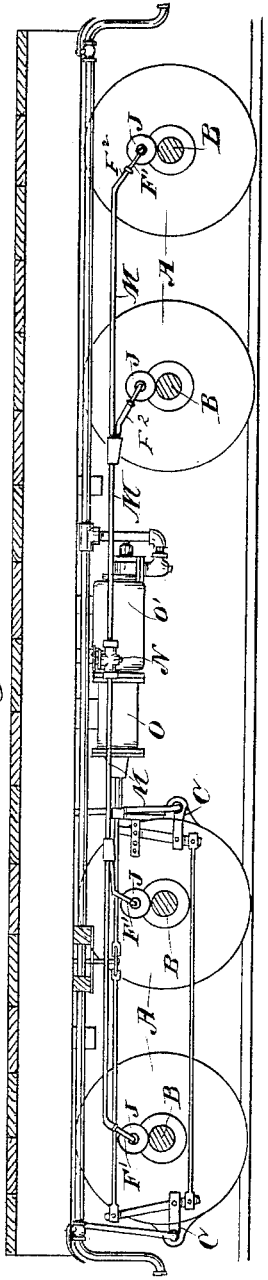
Figure 3:
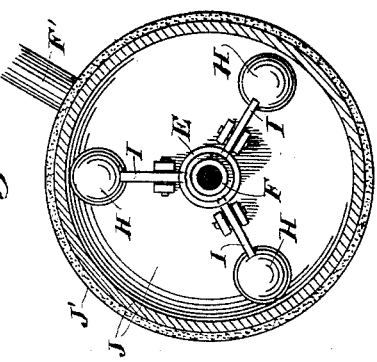
Figure 2:
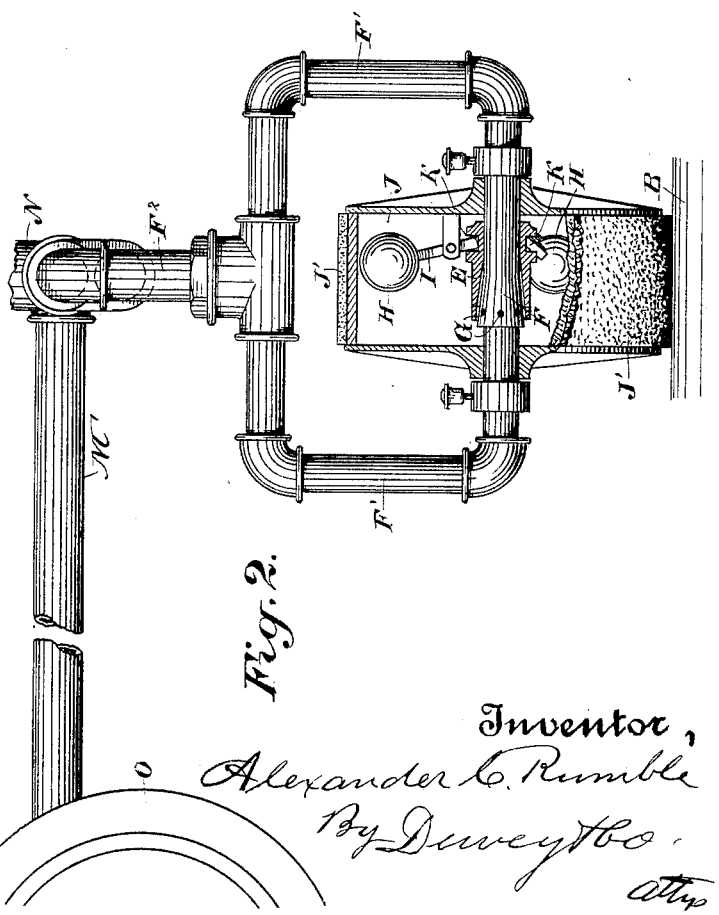
Figure 4:
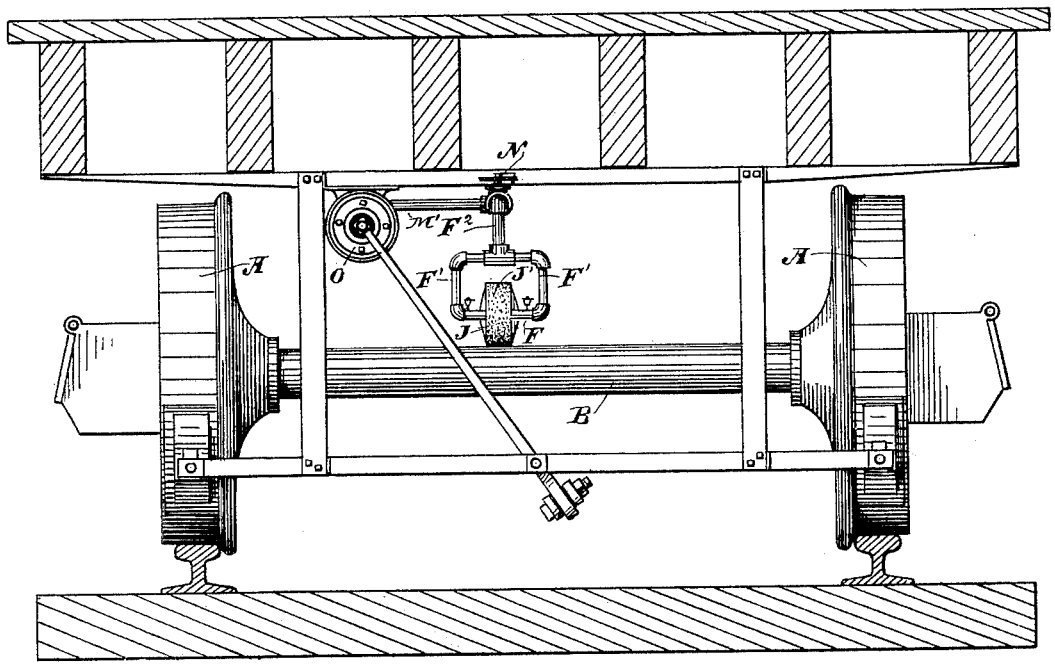

Figure 1 is a longitudinal section through a car, showing the application of my invention. Fig. 2 is an exterior view of the regulator with part broken away. Fig. 3 is a transverse section of the same. Fig. 4 is a transverse section of the car.

The object of my invention is to provide a means for regulating the air-pressure in the brake-cylinder whereby the pressure of the brake-shoes upon the car-wheels is controlled, and it is especially valuable in automatically reducing this pressure, so as to prevent the slipping of the wheels upon the rails and the consequent production of what are known as "flat" wheels, in which a portion of the surface of the wheel is worn flat by reason of its sliding upon the rail without turning.

A A are the wheels of the truck or car, fixed upon the axles B in the usual manner, the axles and wheels revolving together.

C C are brake-shoes adapted to press upon the rims of the wheels and connected by any of the usual or well-known forms of mechanism, whereby they are actuated, and this mechanism is connected with the piston in the air-cylinder, so that when the pressure of the air is applied it acts to force the brake-shoes against the wheels with whatever pressure may be produced by the force of the air within the cylinder. If this pressure becomes too great, one or more pairs of wheels may be locked by the brake-shoes, so that they will slide upon the rails, and this produces what is technically known as a "flat" wheel, where a portion is worn down by the sliding friction and the wheel rendered useless.

The expense of replacing and repairing caused by flat wheels is very great, and my device is especially intended to remedy this difficulty by so controlling the pressure of the air in the brake-cylinder that whenever any pair of wheels ceases to revolve the air-pressure will be immediately reduced and the pressure of the brakes upon the wheels relieved until the latter commence rotating again. This action is rendered automatic by operating the relief-valve directly from the revolving wheels or axle.

In the present case I have shown my device consisting of a valve mounted so as to be operated by the rotation of the axle. The valve, as here shown, consists of a tubular sleeve E, fitting over a similar tubular section F, which connects directly with the brake-cylinder, and the pipe is perforated with small holes, which are closed or opened by the movements of the valve. Various constructions of this valve may be made without departing from the essential features of my invention. In the present case the tube F is made slightly tapering and has the holes G made in the tapering portion. The sleeve E is correspondingly tapered, so that when moved along the tapering part F in one direction it will fit snugly upon it, and will thus close the holes G and prevent any escape of air, but when moved in the opposite direction it will partially uncover the holes, so as to allow air to escape therefrom. The amount of bevel or taper of the valve and its seat is such that the interior air-pressure will force the valve open against a considerable pressure acting to close it. The movements of the valve are produced, preferably, by means of centrifugally-acting weights H, mounted upon arms I, fulcrumed within a case J and having the inner ends of the arms extending into an annular groove or channel K, formed in the sleeve E. The case J and weights H are rotated in unison with the rotation of the wheels, and whenever any pair of wheels having this connection is stopped the weights H are so disposed that they will drop toward the center, and thus, acting through the lever-arms I, will, in conjunction with the air-pressure from within, move the sleeve E backward sufficiently to allow air to escape through the opening G of the pipe F, and this will speedily reduce the pressure of the air in the pipe F, which is connected with the air-brake mechanism, so that the consequent pressure upon the brakes will be correspondingly relieved. Whenever the wheels are stopped, this action will take place, and as soon as the brake is relieved sufficiently to allow them to again revolve the centrifugally-acting weights will move the lever-arms and again move the sleeve E, so as to close the openings. In this way any stopping of the wheels by reason of too great pressure of the brakes, which would be liable to cause the wheel to slide and become worn flat, will be prevented.

The pipe F and sleeve E are, as before described, contained in a casing J, which is suitably journaled and revoluble about the pipe and which has the centrifugally-acting arms fixed so as to revolve with it.

The casing J has preferably a rubber or other soft rim J', which lies in contact with the car-axle B, so that the casing and arms are revolved thereby.

The pipe F passes out centrally through each end of the casing J and connects through branches F' with a pipe F², which connects the device with a pipe M, leading to the brake-cylinder O, the arrangement of the pipes F' being such as to form a yoke or hanger within which the casing J is suspended and revoluble, as described.

The pipe M' leads to and connects the brake-cylinder with a pressure-retaining valve N.

It will be seen that the pipes M upon each car connect with a valve mounted with relation to each of the pairs of wheels beneath the car, so that each pair of wheels has an independent controller, and if one pair of wheels is stopped by too great a brake-pressure or for other reason while the others continue their full revolution the operation of the controller of this one pair of wheels will reduce the pressure thereon until the wheels commence revolving again at their normal speed.

The pressure-retaining valve N is set so as to retain within the brake-cylinders and auxiliary reservoir such a pressure as it is necessary to maintain to operate the brakes, and only the surplus pressure above this amount will be discharged through the valve mechanism E F, previously described, this being allowed to escape as soon as the wheels cease revolving by the action of the centrifugally-operated weights, which instantly fall toward the center and the air-pressure and open the valve, allowing the air to escape until the pressure is reduced sufficiently to permit the wheels to again commence revolving. The pressure which is still maintained within the brake-cylinder will always be enough to hold all the brakes upon any car and enough to set the brakes in case of any break in a part of the train or other accident requiring it. Each car being equipped with my governors will be independent of every other car in the train and its wheels will be preserved from the destructive wear heretofore mentioned.

Having thus described my invention, what I claim as new, and desire to secure by Letters Patent, is—

1. An automatic air-brake governor consisting of a substantially closed cylindrical casing journaled with its periphery in continuous contact with a car-axle, tubular journal connections with said casing and a relief-valve contained therein adapted to be opened and closed by the varying speed of rotation of the car-wheels.

2. An air-brake governor consisting of a substantially closed cylindrical casing, a tubular shaft connecting with the brake-cylinder and upon which the casing is journaled with its periphery in continuous contact with a car-axle, a relief-valve connected with the tubular shaft within the casing and a centrifugally-acting governor within the casing whereby the valve is actuated.

3. In an air-brake governor, a substantially closed cylindrical casing journaled and revoluble upon a pipe in constant communication with the brake-cylinder, said casing having a constant peripheral contact with a revoluble portion of the car-wheel axle, openings formed in the tubular journal-shaft within the casing, a valve controlling said openings and a centrifugally-acting governor contained within the casing and connected with the valve.

4. In an air-brake governor, a substantially closed cylindrical casing journaled upon a tubular shaft which connects with the air-brake cylinder, and having constant peripheral contact with a revoluble car-axle, a valve controlling escape-passages in the tubular shaft and a centrifugally-acting governor connected to operate said valve, both inclosed within the casing.

5. An air-brake governor consisting of a valve connecting with the brake-cylinders of the air-brake mechanism of a car, centrifugally-acting weights connecting with said valve to close it when the wheels are revolving at a normal rate of speed and to open the valve when the revolution of the wheels is checked or ceases, all contained within a cylindrical journaled casing having its periphery in continuous contact with the revoluble car-axle, and a pressure-retaining valve exterior to the casing, connecting with the air-brake cylinder and closable when the pressure within the brake-cylinder has decreased to a determined point.

6. An air-brake governor consisting of a pipe connecting with the brake-cylinder of an air-brake mechanism, a sleeve slidable on said pipe, openings formed in the pipe closable by the sleeve when the latter is moved in one direction and opened when the sleeve is moved in the opposite direction, a cylindrical casing inclosing the valve, journaled about the pipe having its rim in continuous contact with the wheel-axle, centrifugally-acting weights fulcrumed within the casing with lever-arms engaging the movable sleeve whereby the latter is moved to open the escape-ports when the rotation of the car-wheels is checked, and closing said ports when the wheels again revolve.

7. An air-brake governor consisting of a cylindrical casing journaled with its periphery adapted to make contact with a car-axle and be rotated thereby, a tubular shaft upon which the casing is turnable, said shaft having a tapering seat with relief-passages, a valve slidable thereon having the interior adapted to fit over and close said passages, or to open them when withdrawn, fulcrumed weighted levers, one end of which engages the valve and closes it when the weights are thrown outward by centrifugal action, said weights acting in conjunction with the interior air-pressure to open the valve when the centrifugal force decreases.

In witness whereof I have hereunto set my hand.

ALEXANDER C. RUMBLE.

Witnesses:
S. H. NOURSE,
JESSIE C. BRODIE.